United States Patent
Cook

(10) Patent No.: US 7,918,298 B2
(45) Date of Patent: Apr. 5, 2011

(54) BI-DIRECTIONAL ICE-PARTICLE SPRAY GENERATING DEVICE FOR SNOW VEHICLES

(76) Inventor: Travis Andrew Cook, Prairie, ID (US)

( * ) Notice: Subject to any disclaimer, the term of this patent is extended or adjusted under 35 U.S.C. 154(b) by 213 days.

(21) Appl. No.: 12/082,129

(22) Filed: Apr. 9, 2008

(65) Prior Publication Data
US 2008/0290728 A1 Nov. 27, 2008

(51) Int. Cl.
*B62M 29/02* (2006.01)
*E01H 5/12* (2006.01)

(52) U.S. Cl. ............... 180/190; 280/900; 37/219
(58) Field of Classification Search ......... 180/190; 280/809, 900; 37/219
See application file for complete search history.

(56) References Cited

U.S. PATENT DOCUMENTS

| | | | | | |
|---|---|---|---|---|---|
| 2,067,405 | A | * | 1/1937 | Mayne | 57/7 |
| 2,118,103 | A | * | 5/1938 | Oeding | 174/145 |
| RE22,730 | E | * | 3/1946 | Myers | 305/167 |
| 3,145,789 | A | * | 8/1964 | Lawry | 175/386 |
| 3,242,691 | A | * | 3/1966 | Robinson et al. | 464/53 |
| 3,778,994 | A | * | 12/1973 | Humphries | 57/214 |
| 3,800,522 | A | * | 4/1974 | Hughes et al. | 57/215 |
| 3,844,601 | A | * | 10/1974 | Rochester, Jr. | 294/82.14 |
| 3,897,839 | A | * | 8/1975 | Brisebois | 180/190 |
| 4,036,320 | A | * | 7/1977 | Rabehl | 180/190 |
| 4,076,089 | A | * | 2/1978 | Sanders | 180/190 |
| 5,277,266 | A | * | 1/1994 | Robinson | 180/190 |
| 5,540,004 | A | * | 7/1996 | Patterson et al. | 37/244 |
| 6,267,679 | B1 | * | 7/2001 | Romano | 464/58 |
| 7,527,116 | B2 | * | 5/2009 | Aoshima | 180/190 |

* cited by examiner

*Primary Examiner* — Joanne Silbermann
*Assistant Examiner* — Daniel Yeagley
(74) *Attorney, Agent, or Firm* — Holland Law Office PLLC

(57) ABSTRACT

A bi-directional ice-particle spray generating device for use on snow vehicles is disclosed which is primarily constructed of multi-strand wire rope. The use of wire rope as a spring member allows for 360 degree flexibility to enable the design to be compatible with reverse-gear-equipped snow vehicles. A replaceable wear point or points is integral in the design for added durability.

19 Claims, 5 Drawing Sheets

BI-DIRECTIONAL ICE-PARTICLE SPRAY GENERATING DEVICE FOR SNOW VEHICLES

BACKGROUND OF THE INVENTION

1. Field of the Invention

The present invention relates to ice-particle spray generating devices such as are employed on snow vehicles, namely snowmobiles, to both cool and lubricate vital components during operation.

2. Related Art

Snowmobile operation requires that a sufficient ice-particle spray be generated to effectively cool the engine of the snowmobile through convective cooling means using the engine's external fluid-cooling apparatus. This resulting icy spray also acts to lubricate the frictional contact points between the slide rails of the rear track suspension and the track itself. Conventionally, the above-described icy spray is generated by the rubbing action of the rotating drive track's traction lugs as they frictionally engage the terrain during operation. The resulting icy spray caused by the disruption of these ice particles is caught up in the swirling air vortex created by the rotating track and is evenly distributed onto the above-described vital surfaces. However, when the snowmobile is operated on terrain that is of sufficient density that the track's drive lugs do not penetrate enough to create the icy spray, the absence thereof causes serious damage and resulting destruction to the snowmobile.

One attempt at a solution to this problem is proposed in the patent literature (Brisbois, U.S. Pat. No. 3,897,839, August 1975) in which Brisbois attempts to direct the snow spray caused by the runners of the steering skis into the rotating drive track during travel by mounting a directional "fin" on the back of each steering ski. Brisbois' design has limited effect, however, both by its significant distance from the drive track and by the fact that it is required that there be present a sufficient amount of icy spray caused by the runners to be directed into the drive track effectively.

Another attempt is shown in the patent literature (Robinson, U.S. Pat. No. 5,277,266, Jan. 11, 1994) in which is disclosed a snow tilling implement which is mounted to a snowmobile that digs into the snow and sprays broken-up snow on the heat exchanger, track, and slide rail on the underneath side of the snowmobile to cool and lubricate the same. An elongate rod is described, the proximinal portion of which is advantageously bent to form a coil spring and catch arm. The catch arm buts against the snowmobile and causes the coil spring to provide a downward force pressing the distal end of the rod into snow. While effective, this design fails to allow for reverse-gear-equipped snowmobiles. For example, when the snowmobile travels backward and the stated distal end catches and stabs into the snow, the coil formed by the elongate rod is caused to unwind in an undesirable manner, thus causing imminent breakage of the implement. Also, Robinson's design is rendered useless when the "advantageously bent" portion that engages the snow is worn away. Still, an effective method of ice-particle spray generation is needed that is compliant with the more-durable modern snowmobile design and the specific cooling and lubricating needs thereof.

SUMMARY OF THE INVENTION

The invented bi-directional ice-particle spray generating device is comprised primarily of a flexible multi-strand wire-rope section that has lineally attached at both of its two ends a threaded tubular metallic cap, the first of which is bent at a 45 degree angle for attachment to the slide rail of a snowmobile by means of a threaded bolt. This secure attachment to the slide rail causes the wire rope section to extend out and downward at an angle perpendicular to the slide rail. The second cap is attached to the end of the wire rope section which is attached to the first cap and has attached a replaceable wear point that frictionally engages the terrain to generate an icy spray during travel. The use of wire rope and its inherent flexible properties in the design allows for 360 degree repetitious flexing without damage. This device may be employed singly or in multiple numbers on a snowmobile to effectively cool and lubricate vital components.

BRIEF DESCRIPTION OF THE DRAWINGS

The accompanying drawings illustrate several aspects of embodiments of the present invention and are for the purpose only of illustrating the preferred modes of the invention and are not to be construed as limiting to the invention.

DETAILED DESCRIPTION OF THE PREFERRED EMBODIMENT

Figure 1:
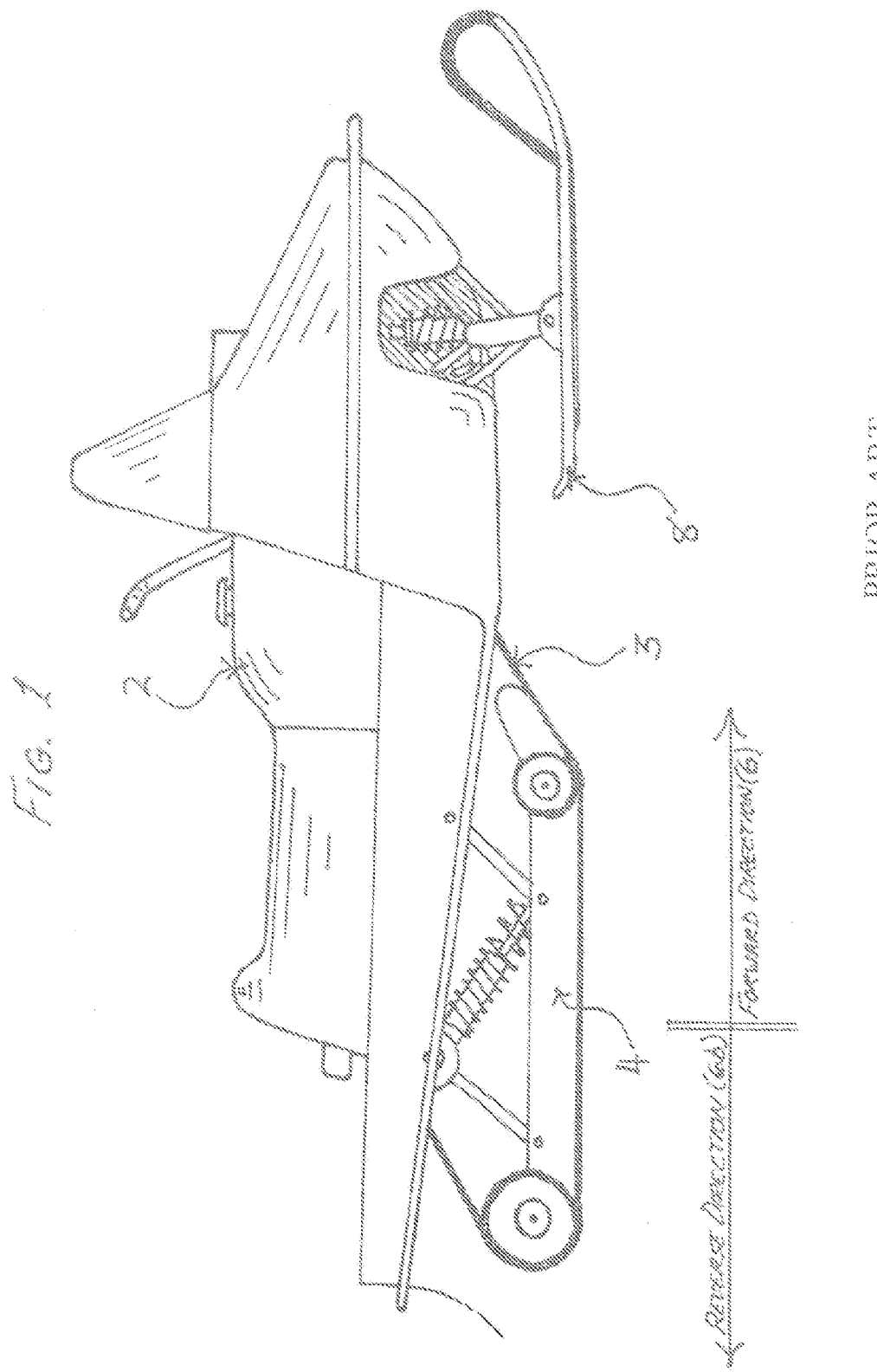
FIG. 1 shows a conventional modern snowmobile having a drive track, slide rails and steering skis.
Figure 2:
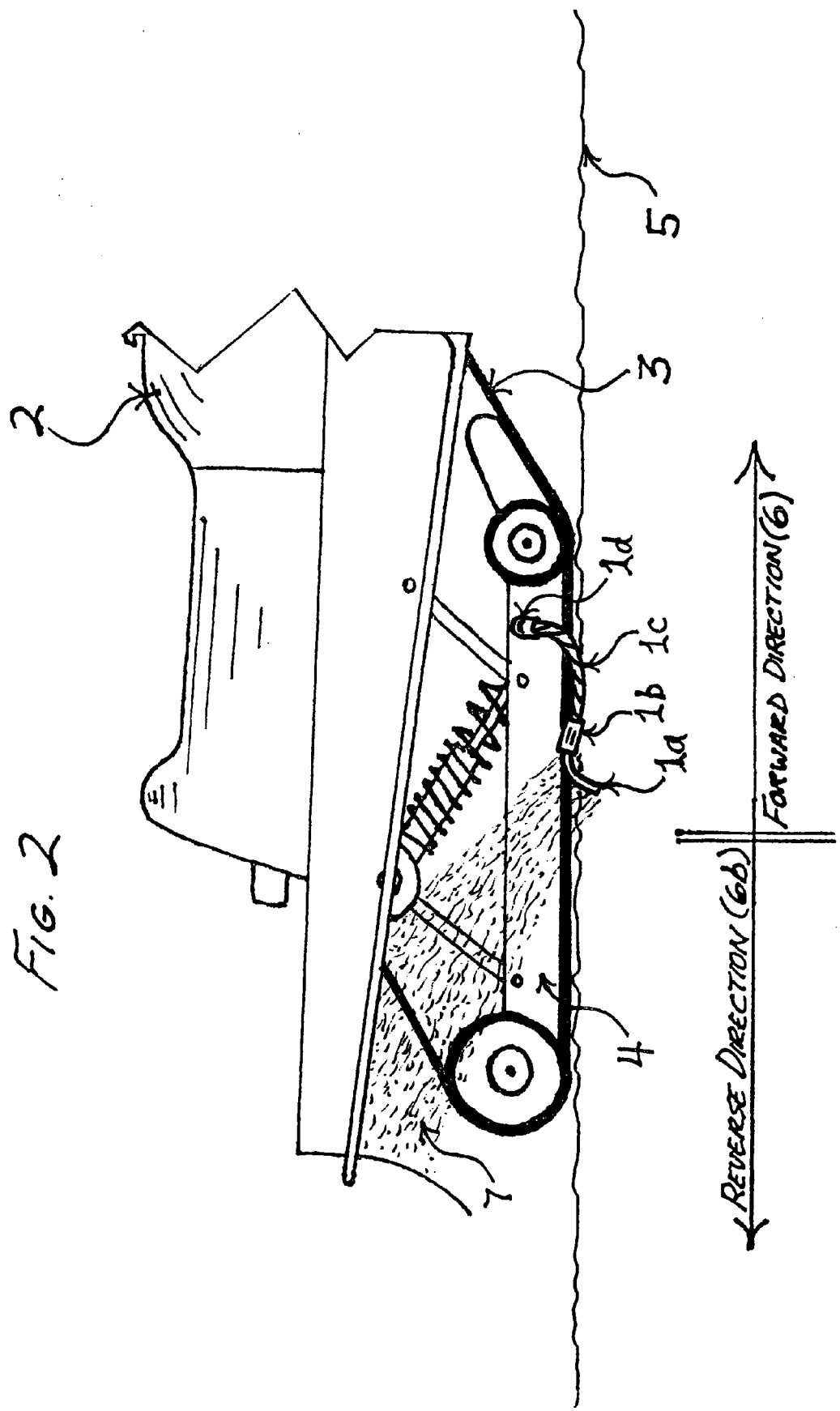
FIG. 2 shows the invention employed on a slide rail of a conventional snowmobile which is shown traveling in a forward direction.
Figure 3:
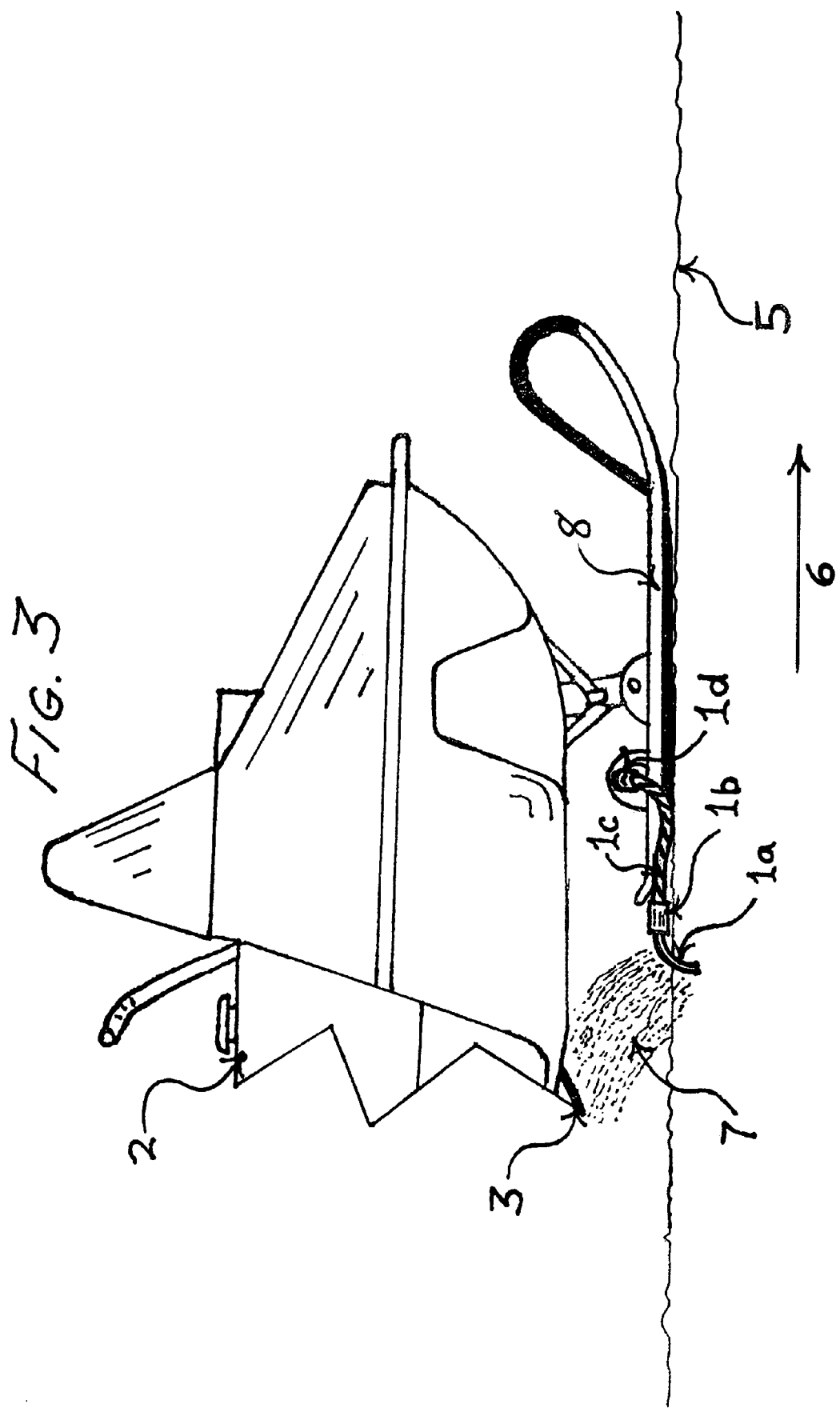
FIG. 3 shows the invention employed on the inside of the left side steering ski of a conventional snowmobile which is shown traveling in a forward direction.
Figure 4:
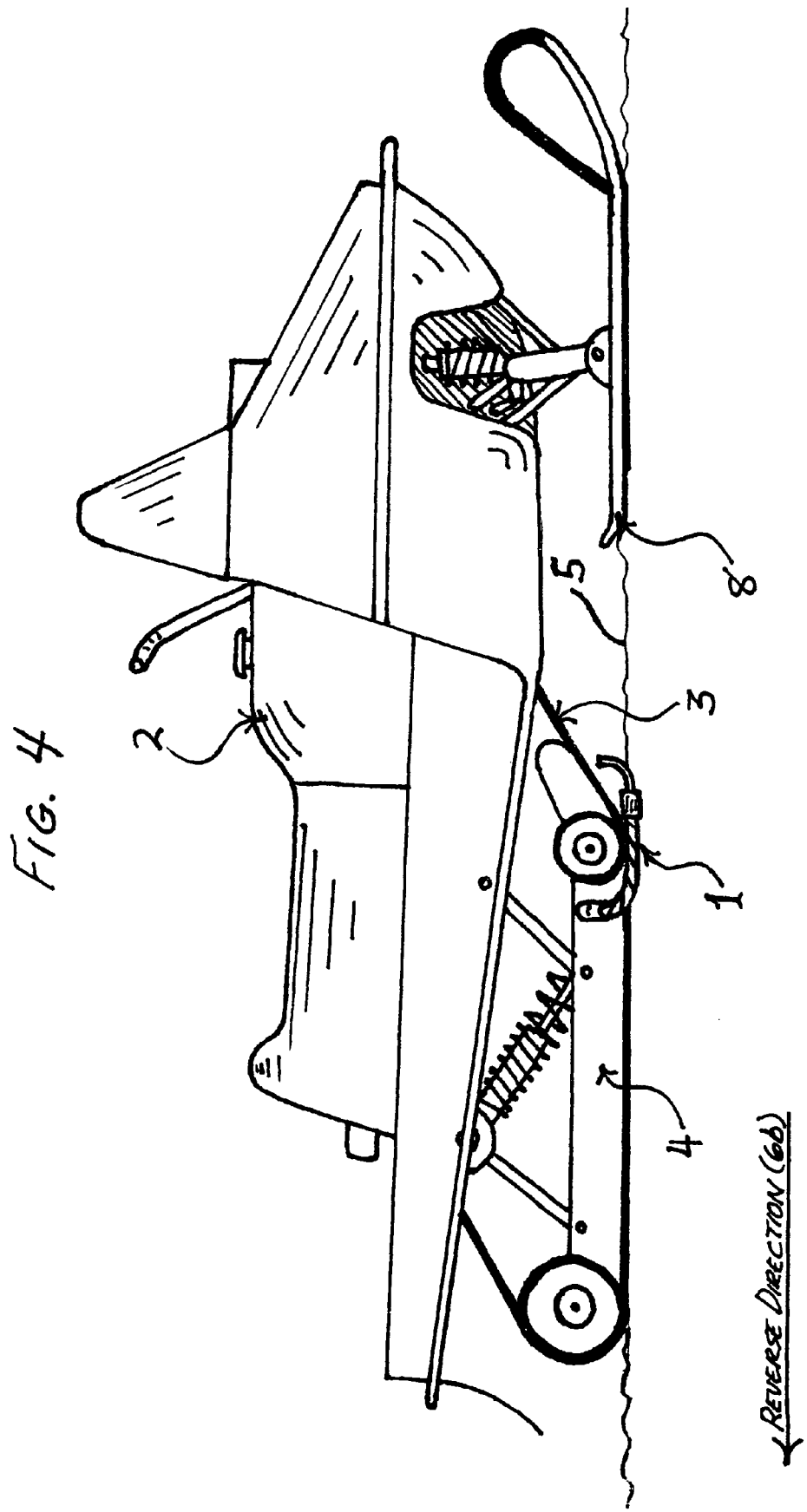
FIG. 4 shows the invention as employed on a conventional snowmobile which is traveling in a reverse direction.
Figure 5:
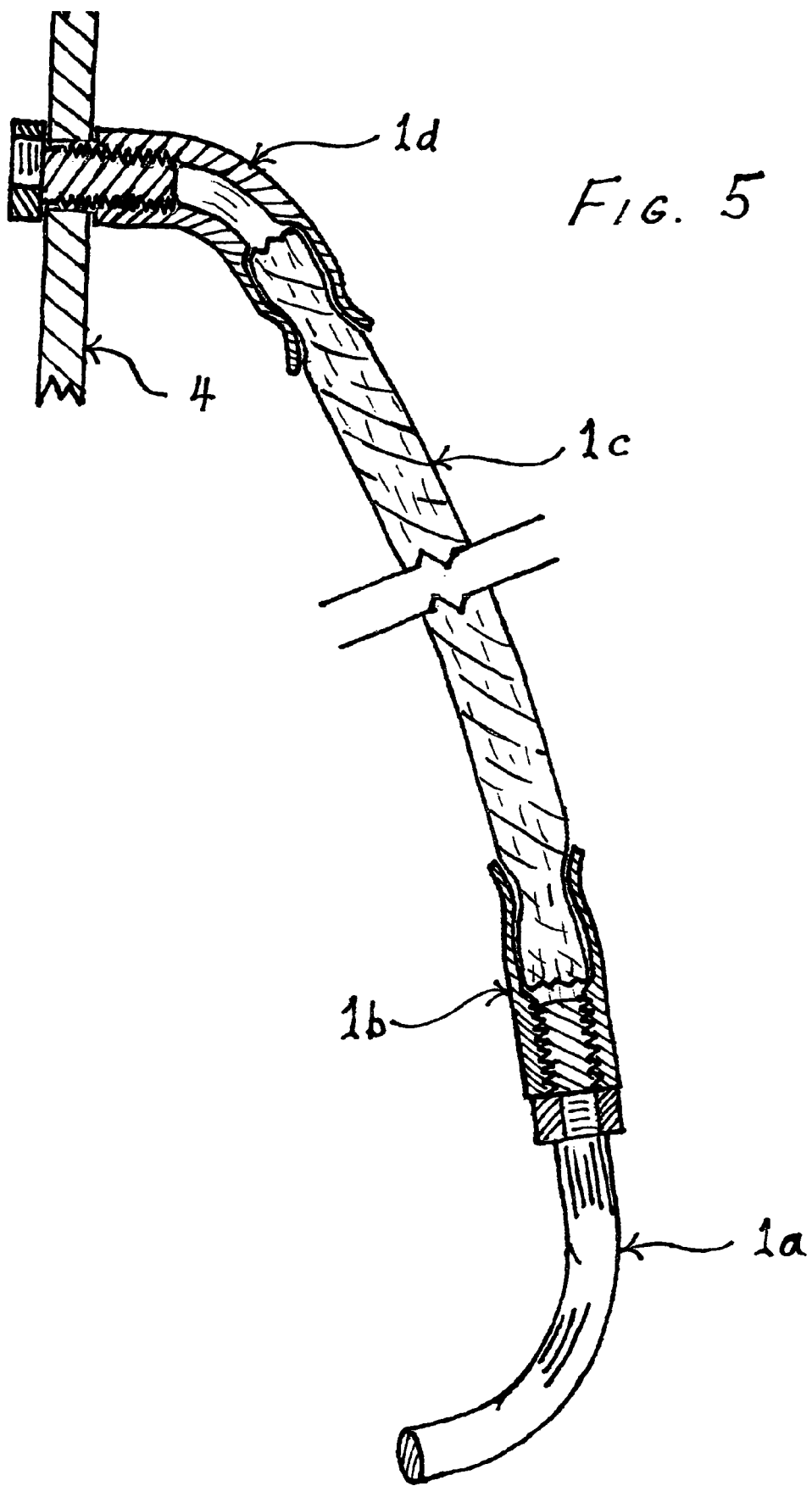
FIG. 5 shows a cut-away view of the invention in singular form.

The present invention may be used singly or in multiples. Mounting location may be on the front section, the middle section, the back section, centrally located along the axis of the snowmobile, or any area to the left or right to the extremity of those locations.

A conventional snowmobile (2) is propelled by a rotatable drive track (3) that slideably revolves around slide rail (4) and is aided in direction changes by steering ski (8). The invention (1) is employed on a snowmobile (2) with a drive track (3) that rotates around the slide-rail (4) that frictionally engages the terrain (5) to propel the snowmobile (2) in a forward direction (6) during normal operation. The invention (1) is mounted to the slide rail (4) by first end cap (1d) and acts in a spring-like manner to frictionally engage the terrain (5) during forward direction (6) travel. When the wear point (1a) of the invention (1) frictionally engages the terrain (6), the normally straight wire rope section (1c), having a spring-like quality, which is attached to the wear point (1a) by second end cap (1b), is caused to bend in a resisting manner to a working position parallel to slide rail (4). The resisting action of the invention (1) creates downward and outward pressure on the wear point (1a) against the terrain (5), which then generates an icy spray (7) which is directed into the drive track (3) of the snowmobile (2). The invention may optionally be employed on the steering ski (8) of a snowmobile (2) in similar fashion as employed on the slide-rail (4). In this application, icy spray (7) is directed into the rotating drive track (3) by the momentum of the snowmobile (2) during forward direction travel (6).

When the snowmobile (2) is operated in reverse direction (6b), the wear point (1a) of the invention (1) catches in the terrain (5) and causes itself and the wire rope section (1c) to flip-upside down, thus negating frictional contact with the terrain (5) and allowing the invention (1) to slide in this position until normal forward travel is resumed.

Physical construction of the invention is as follows; the first end cap (1*d*), being bolted securely to the slide rail (4), is attached by mechanically crimped means to the wire rope section (1*c*), and is also attached by mechanically crimped means to the second end cap (1*b*). Threaded into the second end cap (1*b*) is the replaceable wear point (1*a*) which is secured by a jam-nut.

I claim:

1. A bi-directional ice-particle spray generating device for attachment to a snow vehicle adapted for travel over a terrain comprising:
   a length of metallic wire rope including a plurality of strands, the length of metallic wire rope impregnated with a resilient substance;
   a first threaded tubular metallic cap attached at a first end of the length of metallic wire rope, the first threaded tubular metallic cap adapted to permit threaded attachment of the length of metallic wire rope to the snow vehicle;
   a second threaded tubular metallic cap attached to a second end of the length of metallic wire rope; and
   a wear point threadedly engaging the second threaded tubular metallic cap, the wear point adapted to frictionally engage the terrain to generate an icy spray during travel.

2. The bi-directional ice-particle spray generating device of claim 1 wherein the length of metallic wire rope further comprises a number of strands in the range of two through one-thousand strands.

3. The bi-directional ice-particle spray generating device of claim 1 wherein the wear point further comprises a replaceable wear point.

4. The bi-directional ice-particle spray generating device of claim 1 wherein the length of metallic wire rope further comprises a corrosion-resistant material.

5. The bi-directional ice-particle spray generating device of claim 1 wherein the second threaded tubular metallic cap is bonded to the length of metallic wire rope at a forty-five degree angle so that the length of metallic wire rope extends outward and downward away from the snow vehicle.

6. The bi-directional ice-particle spray generating device of claim 1 wherein the first threaded tubular metallic cap and the second threaded tubular metallic cap are permanently bonded to said length of metallic wire rope by a bonding method selected from a group of bonding methods including electro-fusion, thermo-fusion, mechanical crimp, or chemical means.

7. The bi-directional ice-particle spray generating device of claim 1 wherein the length of metallic wire rope is coated to increase durability.

8. The bi-directional ice-particle spray generating device of claim 1 wherein the wear point further comprises a wear point shape is selected from a group of wear point shapes including a blade, a spike or a disc.

9. The bi-directional ice-particle spray generating device of claim 1 wherein the wear point further comprises a harder than steel for added wear resistance.

10. The bi-directional ice-particle spray generating device of claim 1 wherein the wear point further comprises tungsten-carbide.

11. A bi-directional ice-particle spray generating device for attachment to a snow vehicle comprising:
    a length of metallic wire rope including a plurality of strands, the length of metallic wire rope, the length of metallic wire rope impregnated with a resilient substance;
    a first threaded tubular metallic cap attached at a first end of the length of metallic wire rope, the first threaded tubular metallic cap adapted to permit attachment to of the length of metallic wire rope to the snow vehicle;
    a second tubular metallic cap attached to a second end of the length of metallic wire rope;
    the first threaded tubular metallic cap and the second threaded tubular metallic cap permanently bonded to the length of metallic wire rope by a bonding method selected from a group of bonding methods including electro-fusion, thermo-fusion, mechanical crimp, or chemical means; and
    a wear point attached to the second threaded metallic cap.

12. The bi-directional ice-particle spray generating device of claim 11 wherein the length of metallic wire further comprises a number of strands in the range of two through one-thousand strands.

13. The bi-directional ice-particle spray generating device of claim 11 wherein the wear point further comprises a replaceable wear point.

14. The bi-directional ice-particle spray generating device of claim 11 wherein the length of metallic wire rope further comprises a corrosion-resistant material.

15. The bi-directional ice-particle spray generating device of claim 11 wherein the second threaded tubular metallic cap is bonded to the length of metallic wire rope at a forty-five degree angle so that the length of metallic wire rope extends outward and downward away from the snow vehicle.

16. The bi-directional ice-particle spray generating device of claim 11 wherein the length of metallic wire rope is coated to increase durability.

17. The bi-directional ice-particle spray generating device of claim 11 wherein the wear point further comprises a wear point shape is selected from a group of wear point shapes including a blade, a spike or a disc.

18. The bi-directional ice-particle spray generating device of claim 11 wherein the wear point further comprises a harder than steel for added wear resistance.

19. The bi-directional ice-particle spray generating device of claim 11 wherein the wear point further comprises tungsten-carbide for added wear resistance.

* * * * *